(12) United States Patent
Barmichev et al.

(10) Patent No.: US 11,046,418 B2
(45) Date of Patent: Jun. 29, 2021

(54) ARTICULATED EMPENNAGE WITH RUDDERVATOR

(71) Applicant: The Boeing Company, Chicago, IL (US)

(72) Inventors: Sergey Barmichev, Kirkland, WA (US); Mithra Sankrithi, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 16/141,920

(22) Filed: Sep. 25, 2018

(65) Prior Publication Data
US 2020/0094941 A1 Mar. 26, 2020

(51) Int. Cl.
*B64C 5/16* (2006.01)
*B64C 9/00* (2006.01)
*B64C 5/02* (2006.01)

(52) U.S. Cl.
CPC ............... *B64C 5/16* (2013.01); *B64C 5/02* (2013.01); *B64C 9/00* (2013.01)

(58) Field of Classification Search
CPC .... B64C 5/16; B64C 9/00; B64C 5/02; B64C 13/24; B64C 13/16; B64C 7/00; B64C 9/02
See application file for complete search history.

(56) References Cited

U.S. PATENT DOCUMENTS

| | | | | |
|---|---|---|---|---|
| 1,588,141 A | * | 6/1926 | Rohrbach | B64C 9/02 244/87 |
| 2,670,910 A | * | 3/1954 | Hill | B64C 3/40 244/218 |
| 2,989,269 A | * | 6/1961 | Le Bel | B64C 29/0033 244/12.3 |
| 3,146,970 A | * | 9/1964 | Girard | B64C 27/26 244/7 A |
| 3,807,665 A | * | 4/1974 | Coombe | B64D 27/00 244/55 |
| 4,261,533 A | * | 4/1981 | Roberts | B64C 5/10 244/213 |
| 6,273,363 B1 | * | 8/2001 | Sprenger | B64C 5/02 244/119 |

(Continued)

OTHER PUBLICATIONS

Wikipedia, "Handley Page Victor", URL: https:https://en.wikipedia.org/wiki/Handley_Page_Victor, First Flight 1952, circa before Sep. 25, 2018, 21 pages.

(Continued)

*Primary Examiner* — Brian M O'Hara
*Assistant Examiner* — Keith L Dixon
(74) *Attorney, Agent, or Firm* — Kolisch Hartwell, P.C.

(57) ABSTRACT

An aircraft empennage includes a lower vertical member attached to a rear portion of a fuselage, and an upper stabilizer assembly connected to the lower vertical member by an articulating mount configured to allow movement of the upper stabilizer assembly relative to the lower vertical member to adjust pitch trim of the fuselage. The upper stabilizer assembly includes a V-shaped tail member having a pair of angled stabilizer portions, and each angled stabilizer portion has a trailing-edge ruddervator control surface. A rudder may be attached to a trailing edge of the lower vertical member.

20 Claims, 9 Drawing Sheets

(56) References Cited

U.S. PATENT DOCUMENTS

| | | | |
|---|---|---|---|
| 8,014,910 B2* | 9/2011 | Mathieu | G05D 1/0661 |
| | | | 701/7 |
| 2003/0094537 A1* | 5/2003 | Austen-Brown | B64D 25/00 |
| | | | 244/7 R |
| 2007/0102575 A1* | 5/2007 | Morgan | B64C 9/06 |
| | | | 244/87 |
| 2016/0176505 A1* | 6/2016 | Chandrasekharan | B64C 9/00 |
| | | | 244/87 |
| 2017/0129592 A1* | 5/2017 | Clemen, Jr. | B64C 23/00 |
| 2019/0375491 A1* | 12/2019 | Wilson | B64C 5/06 |
| 2020/0148329 A1* | 5/2020 | White | B64C 15/02 |

OTHER PUBLICATIONS

Wikipedia, "Lockheed JetStar", URL: https://en.wikipedia.org/wiki/Lockheed_JetStar, First Flight 1957, circa before Sep. 25, 2018, 9 pages.

* cited by examiner

ARTICULATED EMPENNAGE WITH RUDDERVATOR

FIELD

This disclosure relates to aircraft empennage structures. More specifically, the disclosed examples relate to systems and methods associated with empennages having ruddervators.

INTRODUCTION

An aircraft empennage typically includes one or more fixed and/or movable surfaces disposed at a tail end of the aircraft fuselage and configured to direct and/or stabilize the aircraft. Empennage design is subject to several constraints. It is desirable that the empennage be as light as possible and have as little drag as possible, while still being capable of providing sufficient pitch and yaw stability as well as pitch and yaw control for aircraft operation. Additionally, it is preferable that the empennage and associated structures occupy as little of the aircraft fuselage as possible, in order to maximize the amount of fuselage space available for payload such as passengers and cargo. An empennage that meets these demands better than known empennages would allow for improved aircraft capacity, fuel efficiency, and operating economics.

SUMMARY

The present disclosure provides systems, apparatuses, and methods relating to aircraft empennages. In some examples, an aircraft comprises a fuselage capable of carrying payload, the fuselage having a rear portion; an empennage connected to the rear portion of the fuselage, the empennage including a lower vertical member, and an upper stabilizer assembly connected to the lower vertical member by an articulating mount configured to allow movement of the entire upper stabilizer assembly relative to the lower vertical member to adjust pitch trim of the fuselage in a flight mode, the upper stabilizer assembly further including a V-shaped tail member having a pair of angled stabilizer portions, each angled stabilizer portion having a trailing-edge control surface; and a controller enabling independent asymmetric adjustment of the trailing-edge control surfaces generating a first yaw control moment acting on the aircraft.

In some examples, an aircraft comprises a fuselage capable of carrying payload, the fuselage having a rear portion; an empennage connected to the rear portion of the fuselage, the empennage including a vertical fin member rigidly connected to the fuselage; and a V-shaped tail portion adjustably mounted to a distal portion of the vertical fin member.

In some examples, a method of controlling an aircraft comprises trimming pitch of a V-shaped tail portion relative to a lower fin member connected to an end portion of an aircraft.

Features, functions, and advantages may be achieved independently in various examples of the present disclosure, or may be combined in yet other examples, further details of which can be seen with reference to the following description and drawings.

DETAILED DESCRIPTION

Figure 1:
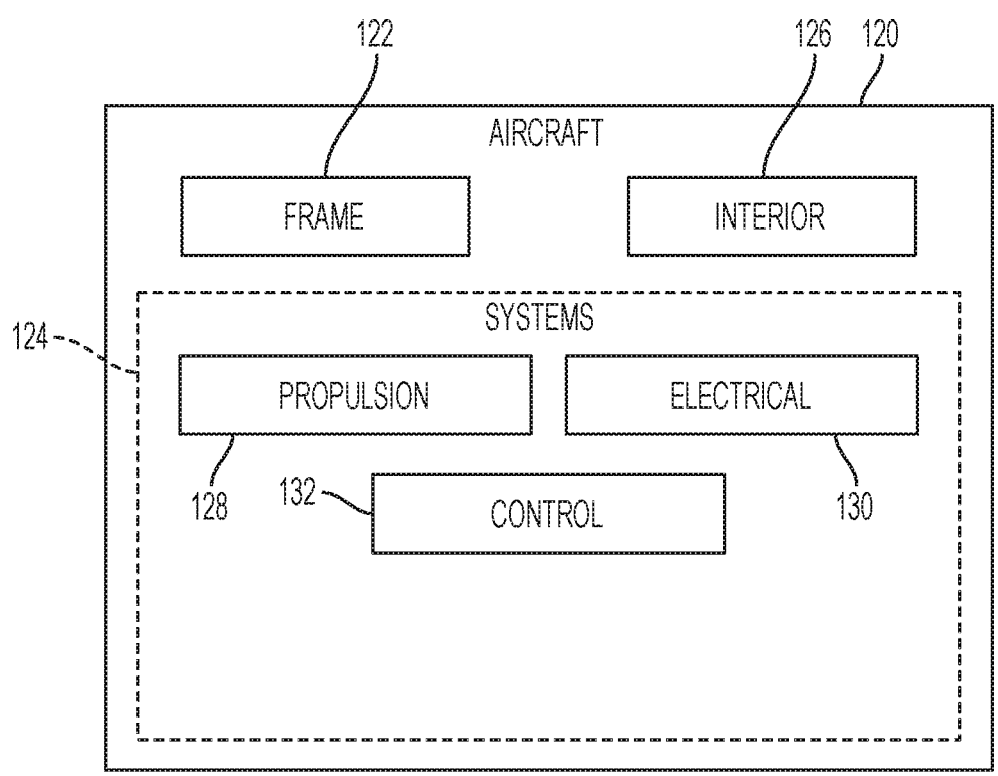
FIG. 1 is a schematic diagram of an illustrative aircraft in accordance with aspects of the present disclosure.

Various aspects and examples of an empennage having ruddervators, as well as related methods, are described below and illustrated in the associated drawings. Unless otherwise specified, an empennage in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through G, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," and "aft" (and the like) are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a crossbar may have a "forward" edge, based on the fact that the crossbar would be installed with the edge in question facing in the direction of the front portion of the host vehicle.

"Coupled" means connected, either permanently or releasably, whether directly or indirectly through intervening components.

Overview

In general, an empennage in accordance with aspects of the present teachings includes a lower vertical member connected to a rear portion of an aircraft fuselage, and an upper stabilizer assembly connected to the lower vertical member by an articulating mount. The articulating mount is configured to allow movement of the entire upper stabilizer assembly relative to the lower vertical member. The empennage, which may also be referred to as a tail or tail assembly, typically includes at least one device (e.g. a control surface) configured for generating at least one moment acting on the aircraft. Accordingly, the empennage is typically configured for contributing to longitudinal and directional stability of the aircraft. The aircraft typically includes a controller enabling adjustment of the control devices.

A moment generated by an empennage device may be characterized as a stabilizing moment, a control moment (e.g., a moment configured to control a direction of movement of an aircraft), or a trim moment (e.g., a moment configured to maintain a set aircraft direction). In some cases, an empennage device may be capable of generating a control moment or a trim moment, as needed. Generating a trim moment acting on the aircraft may also be referred to as trimming the aircraft, and/or as adjusting trim.

Generated moments may be further characterized as having components (e.g., torque components) about a yaw axis, pitch axis, and/or roll axis of the aircraft. A yaw moment is a moment configured to rotate the aircraft about the yaw axis, a pitch moment is a moment configured to rotate the aircraft about the pitch axis, and a roll moment is a moment configured to rotate the aircraft about the roll axis. A single empennage device may be configured to generate a moment having components about a single axis, about two axes, or about three axes.

An empennage according to the present teachings typically has devices configured for generating yaw moments and/or pitch moments. As one example, the lower vertical member of the empennage, which may also be referred to as a fin or a vertical stabilizer, typically has a rudder disposed at a trailing edge (e.g., an aft edge). The rudder position (e.g., an angular position with respect to the trailing edge of the fin) may be selected such that the rudder generates a desired yaw moment acting on the aircraft.

As another example, the upper stabilizer assembly of the empennage is typically configured such that rotation of the upper stabilizer assembly relative to the lower vertical member generates a pitch trim moment. For example, the articulating mount may be configured to allow rotation of the upper stabilizer assembly about an axis substantially perpendicular to a plane of symmetry of the fuselage. Accordingly, the upper stabilizer assembly may be moved relative to the lower vertical member to adjust pitch trim of the aircraft.

As yet another example, the upper stabilizer assembly of the empennage typically comprises a V-shaped tail member having a pair of angled stabilizer portions configured in a V-shape. Each angled stabilizer portion has a trailing-edge control surface, which may be referred to as a ruddervator. A control system of the aircraft typically enables the pair of ruddervators to be operated either symmetrically or asymmetrically. Symmetric operation of the ruddervators may generate a pitch moment, and asymmetric operation of the ruddervators may generate a yaw moment.

The angled stabilizer portions of the upper stabilizer assembly may form an upwardly-facing V-shape, in which case the empennage may be referred to as a V-tail empennage. Alternatively, the angled stabilizer portions may form a downwardly-facing V-shape, in which case the empennage may be referred to as an inverted V-tail empennage. Although there are known empennage designs sometimes referred to as V-tail or inverted V-tail empennages, the empennages of the present teachings are different from known empennages in significant ways. For example, as described above, the V-shaped tail member of the empennages described herein is movably mounted to a vertical fin, and no known empennage has this feature.

In examples wherein the V-shaped tail portion forms an upwardly-facing angle, the V-shaped tail portion mounted on the vertical fin may form a "Y" shape, and/or may resemble a slingshot, when viewed from the front. Accordingly, these examples may be referred to as Y-empennages, and/or as slingshot empennages.

EXAMPLES, COMPONENTS, AND ALTERNATIVES

The following sections describe selected aspects of exemplary empennages as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Aircraft and Associated Method

FIG. 1 schematically depicts an illustrative aircraft 120 in accordance with the present teachings. Aircraft 120 may include a frame 122 (also referred to as an airframe) with a plurality of systems 124 and an interior 126. External surfaces of frame 122 are typically carefully contoured for desirable aerodynamic attributes related to, e.g., drag minimization, lift maximization, stability, control, and/or any other suitable property. Examples of plurality of systems 124 include one or more of a propulsion system 128, an electrical system 130, and a control system 132. Each system may comprise various subsystems, such as controllers, processors, actuators, effectors, motors, generators, etc., depending on the functionality involved. Any number of other systems may be included.

Figure 2:
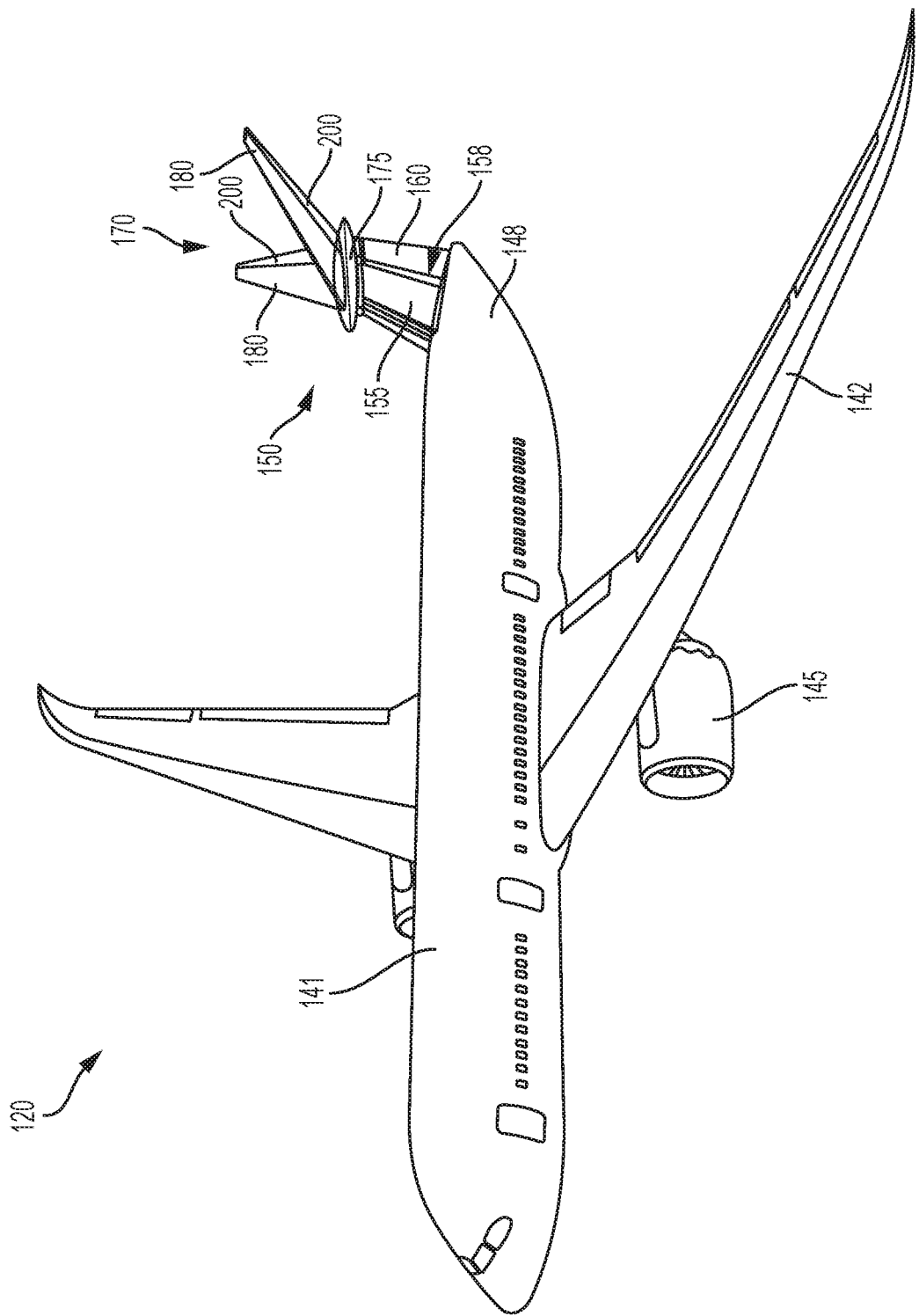
FIG. 2 is an isometric view of the aircraft of FIG. 1.

FIG. 2 is an isometric view of illustrative aircraft 120. As shown in FIG. 2, aircraft 120 includes a fuselage 141 capable of carrying payload (such as passengers, baggage, and/or revenue cargo), and at least one wing 142 attached to the fuselage and capable of generating aerodynamic lift acting on the aircraft. Fuselage 141 and wing 142 are example components of aircraft frame 122. Aircraft 120 further includes at least one propulsor 145. Propulsor 145 is an example component of propulsion system 128, and may comprise, e.g., one or more engines, gas turbines, turbofans, geared turbofans, fans, propellers, open rotors, augmentor fans, and/or any other devices capable of generating thrust acting on the aircraft. Propulsor 145 is typically attached to wing 142, fuselage 141, and/or to any other suitable portion of aircraft frame 122.

Fuselage 141 has a rear portion 148, which may also be referred to as an aft portion or tail portion. An empennage may be connected to rear portion 148. Illustrative example empennages are described in the next sections.

B. Illustrative Empennage with V-Shaped Tail

This section describes an illustrative V-tail empennage 150, in accordance with aspects of the present teachings. V-tail empennage 150, which is illustrated in FIGS. 2-8, is an example of an empennage having an articulated upper stabilizer assembly, as described above.

Figure 3:
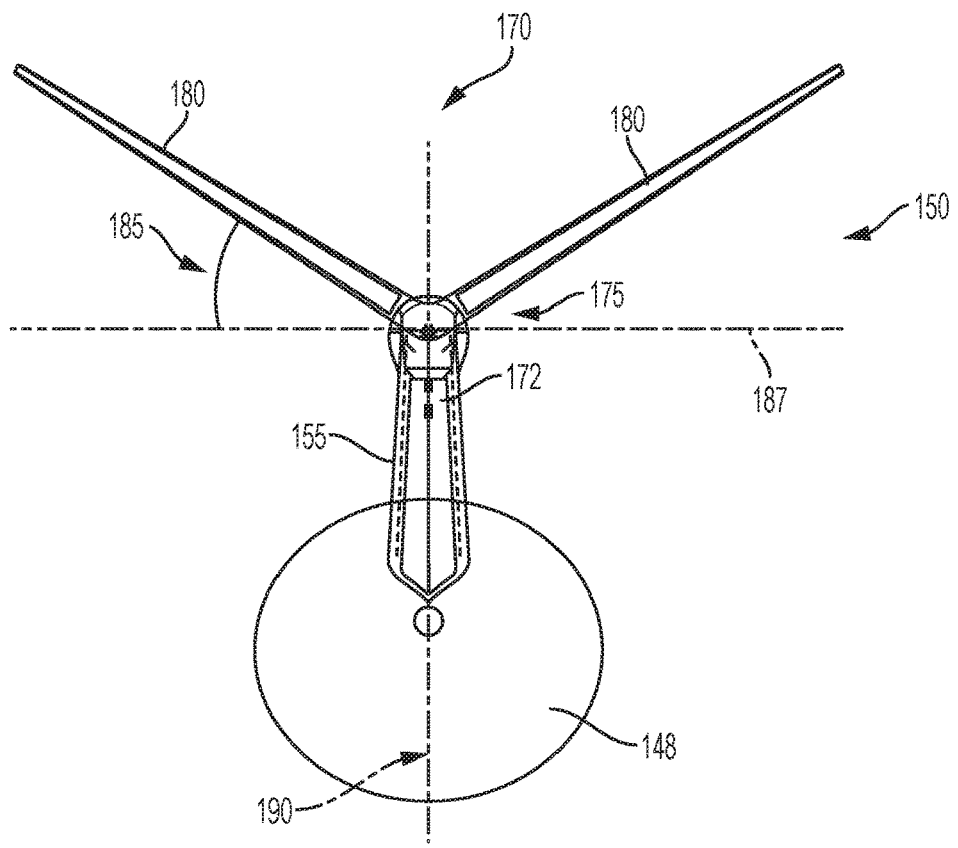
FIG. 3 is a front view of an illustrative V-tail empennage in accordance with aspects of the present disclosure.

V-tail empennage 150 is depicted in an isometric view in FIG. 2, and in a front view in FIG. 3. As shown in these figures, V-tail empennage 150 includes a lower vertical member 155 rigidly attached to fuselage rear portion 148. Lower vertical member 155 may have any size and shape suitable for providing directional stability to aircraft 120. Typically, as in the examples shown in FIGS. 2-3, lower vertical member 155 extends upwardly from fuselage rear portion 148. Lower vertical member 155 may be sized and shaped such that the lower vertical member produces as little aerodynamic drag as possible.

Lower vertical member 155 has a trailing edge 158. A rudder 160 (also referred to as a lower rudder) is movably attached to trailing edge 158 and configured to generate a yaw moment acting on aircraft 120. Typically, rudder 160 is capable of generating a yaw control moment or a yaw trim moment, as needed. A position of rudder 160 relative to lower vertical member 155 may be controlled (e.g., by aircraft control system 132) to generate a desired moment. Rudder 160 may be attached to trailing edge 158 in any suitable manner. For example, the attachment may be hinged, such that rudder 160 is configured to pivot about an axis located at and/or adjacent trailing edge 158. Additionally, or alternatively, rudder 160 may be configured for translational movement relative to lower vertical member 155. Lower vertical member 155 comprises a structural box (e.g., a structural member or foundation) mounted fixedly to fuselage 141 and configured to support movable rudder 160 and the movable upper stabilizer assembly. Rudder 160 may comprise a single-hinged rudder, a double-hinged rudder, a triple-hinged rudder, a tabbed rudder, a slotted rudder, a blown rudder, and/or any other suitable rudder. In some cases, more than one rudder is attached to trailing edge 158.

V-tail empennage 150 further includes an upper stabilizer assembly 170 mounted to a distal portion 172 of lower vertical member 155 (e.g., to a portion of the lower vertical member that is distal to fuselage 141). Upper stabilizer assembly 170 is connected to lower vertical member 155 through an articulating mount 175. Articulating mount 175 is configured to allow movement of upper stabilizer assembly 170 relative to lower vertical member 155, thereby adjusting a pitch trim of aircraft 120. Movement of articulating mount 175 is discussed further below with reference to FIGS. 5-6.

Upper stabilizer assembly 170 includes a pair of angled stabilizer portions 180. Angled stabilizer portions 180 extend from articulating mount 175 in an upwardly-facing V-shape. Angled stabilizer portions 180 form a V-shaped tail member 181. As shown in the front view of FIG. 3, angled stabilizer portions 180 each form a positive dihedral angle 185 with a horizontal axis 187. Horizontal axis 187 extends through articulating mount 175 in a direction parallel to the pitch axis and perpendicular to a plane of symmetry 190 of fuselage 141. Plane of symmetry 190 is depicted as an edge view in FIG. 3. Typically, angled stabilizer portions 180 are disposed at the same angle relative to horizontal axis 187, but in some examples, each angled stabilizer portion may form a different angle relative to the horizontal axis.

Figure 4:
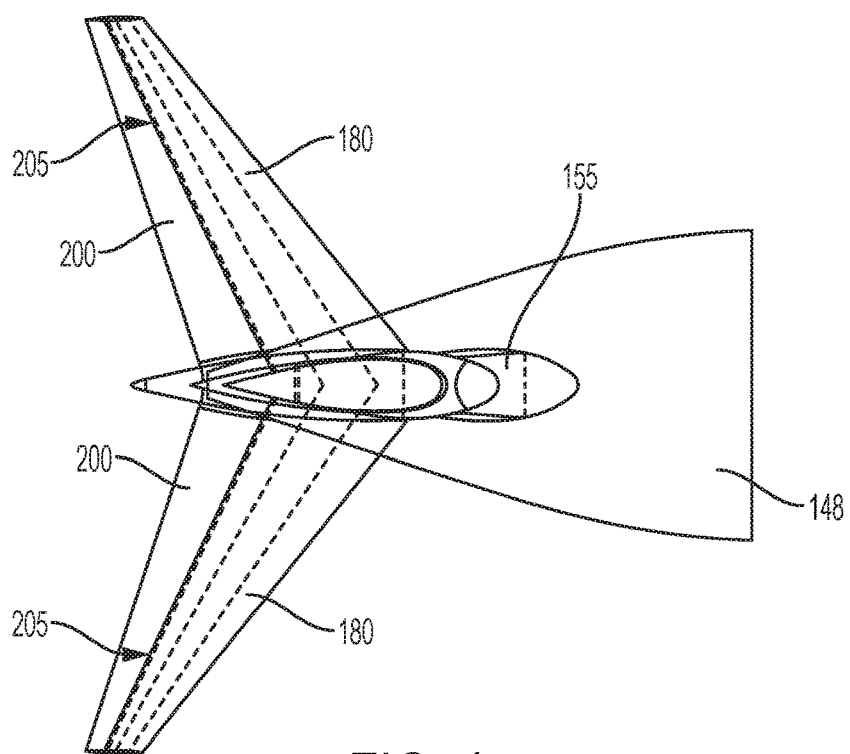
FIG. 4 is a top view of the V-tail empennage of FIG. 3.

As shown in FIG. 4, which is a top view, each angled stabilizer portion 180 has a ruddervator 200. Ruddervator 200 is disposed at a trailing edge 205 (e.g., an aft edge) of the corresponding angled stabilizer portion 180. Typically, ruddervator 200 is connected hingedly to trailing edge 205, and one or more actuators are configured to adjust an angular position of the ruddervator relative to the corresponding angled stabilizer portion 180. Each ruddervator 200 is typically configured to be adjusted independently of the other ruddervator, but in some cases the adjustment of one ruddervator is configured to depend on a position and/or movement of the other ruddervator. In some examples, the ruddervators are double-hinged.

The angular position of each ruddervator 200 determines a pitch moment and/or yaw moment generated on aircraft 120 by the ruddervator. The pair of ruddervators 200 may be adjusted such that the net moment generated by the ruddervators (e.g., a vector sum of the moments generated by the two ruddervators) has a desired pitch component and/or a desired yaw component. As an example, ruddervators 200 may be operated symmetrically. That is, both ruddervators 200 may be deflected by a similar amount in a same direction with respect to the associated angled stabilizer portion 180, such that the ruddervators both generate pitch moments in a same direction (e.g., both along the positive pitch axis, or both along the negative pitch axis) and generate yaw moments in opposing directions. The term "symmetric operation" or "symmetric adjustment" typically refers to operation wherein the opposing yaw moments at least partially cancel each other, so that the net moment cooperatively generated by the ruddervator pair is predominantly a pitch moment. Accordingly, symmetric operation of ruddervators 200 is typically used to generate a pitch moment.

As another example, ruddervators 200 may be operated asymmetrically; e.g., the ruddervators may be deflected by a similar amount in opposite directions relative to the associated angled stabilizer portion 180. That is, one ruddervator may be deflected upwards by a desired amount, and the other ruddervator may be deflected downwards by a similar amount. When operated asymmetrically, ruddervators 200 both generate yaw moments in a same direction and generate pitch moments in opposing directions. The term "asymmetric operation" or "asymmetric adjustment" typically refers to operation wherein the opposing pitch moments at least partially cancel each other, so that the net moment cooperatively generated by the ruddervator pair is predominantly a yaw moment. Accordingly, asymmetric operation of ruddervators 200 is typically used to generate a yaw moment.

In yet other examples, ruddervators 200 may be operated to cooperatively generate both a pitch and a yaw moment. For example, deflecting one of the ruddervators by a large amount and deflecting the other ruddervator by a very small amount may generate a net moment having both a significant pitch component and a significant yaw component.

The relative magnitudes of the maximum pitch component and yaw component generatable by ruddervators 200 depend on angle 185 between angled stabilizer portions 180 and horizontal axis 187. For example, if angle 185 is very small, so that angled stabilizer portions 180 are nearly parallel to horizontal axis 187, then the magnitude of the yaw moment generatable by ruddervators 200 is typically too small for practical use as a source of yaw control and/or yaw trim. In this case, ruddervators 200 would comprise elevators rather than ruddervators. In order to avoid this problem, V-tail empennage 150 typically has angle 185 configured to enable pitch control and yaw control. For example, angle 185 may be at least 20 degrees. An angle smaller than 20 degrees may be insufficient to enable yaw control and/or yaw trim.

Operating ruddervators 200 to generate a yaw moment may also generate a roll moment. For example, in order to generate a yaw moment that produces a left-hand turn, the left ruddervator may be deflected downward and the right ruddervator may be deflected upward. This asymmetric operation produces a yaw moment pushing the empennage to the right, causing the nose of the aircraft to turn left. However, the trailing-edge left deflections of both the ruddervators tends to rotate the empennage such that the right angled stabilizer portion lifts downward and the left angled stabilizer portion lifts upward, effectively causing a clockwise or right roll moment on the aircraft. The clockwise roll moment opposes the left-hand turn produced by the original yaw moment. This is an example of adverse roll-yaw coupling, which may be experienced by V-tail empennage 150. However, the roll moment produced by ruddervator operation is typically small compared to the roll moment generated by other means (e.g., by operations of ailerons and/or spoilers on wings 142). Accordingly, although aircraft control systems may account for the adverse roll-yaw coupling, generation of an adverse roll moment is not typically a purpose of ruddervator operation.

Figure 6:
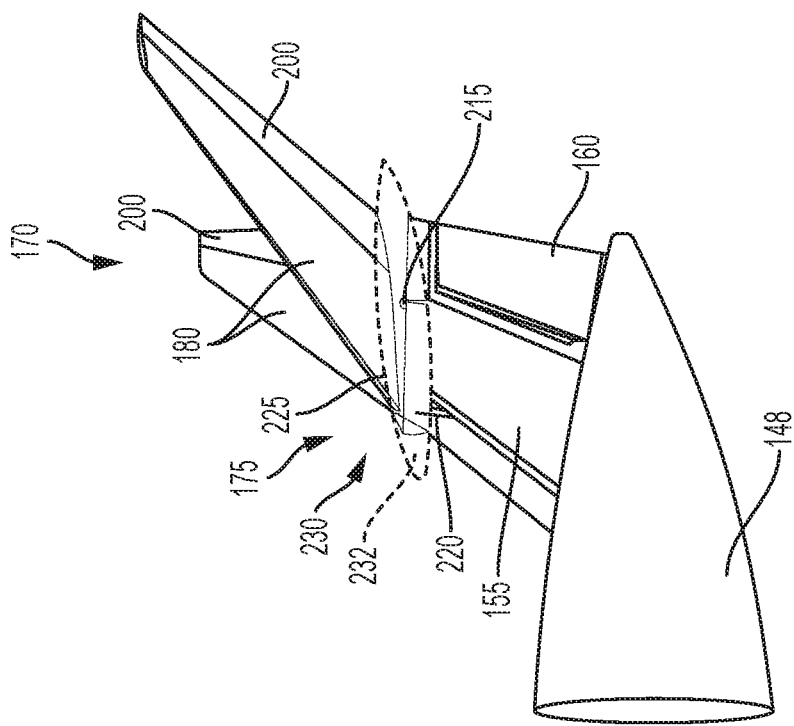
FIG. 6 is an angled side view of the V-tail empennage oriented at a negative incidence.
Figure 5:
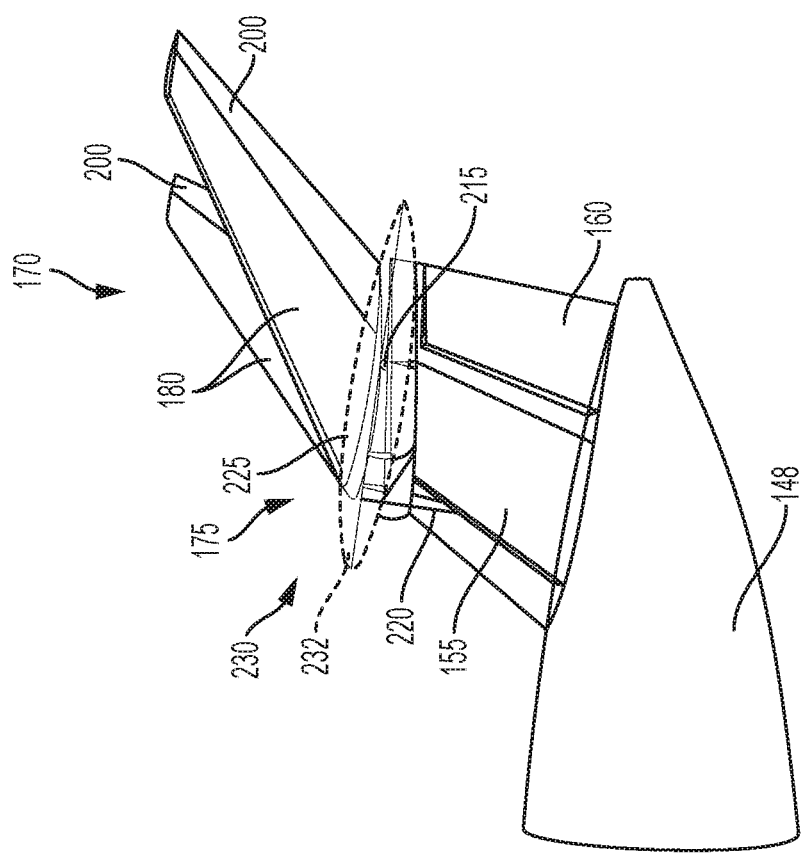
FIG. 5 is an angled side view of the V-tail empennage oriented at a positive incidence.

As described above, upper stabilizer assembly 170 is connected to lower vertical member 155 through an articulating mount 175. Articulating mount 175, depicted in FIGS. 5-6, is configured to generate a pitch moment by adjusting a position of upper stabilizer assembly 170 relative to lower vertical member 155. Articulating mount 175 is typically configured to allow rotation of upper stabilizer assembly 170 about a rotation axis 215 substantially perpendicular to plane of symmetry 190. Rotation axis 215 is depicted extending into the page in FIGS. 5-6. Rotating upper stabilizer assembly 170 about rotation axis 215 may change a pitch of the upper stabilizer assembly relative to lower vertical member 155. Additionally, or alternatively, this rotation may change an angle of incidence of upper stabilizer assembly 170 (e.g., an angle between a longitudinal axis of the upper stabilizer assembly and a longitudinal axis of fuselage 141). FIG. 5 depicts upper stabilizer assembly 170 rotated to a positive angle of incidence, and FIG. 6 depicts upper stabilizer assembly 170 rotated to a negative angle of incidence. In FIGS. 2-4, upper stabilizer assembly 170 is depicted at zero incidence.

Articulating mount 175 includes an articulation device 220. Articulation device 220 may comprise any suitable mechanism configured to rotate upper stabilizer assembly 170 about rotation axis 215. In the example depicted in FIGS. 5-6, articulation device 220 comprises a jackscrew actuator attached to lower vertical member 155 and configured to push a lower portion 225 of upper stabilizer assembly 170, such that the upper stabilizer assembly rotates about rotation axis 215. Alternatively, or additionally, articulation device 220 may comprise a hydraulic actuator, an electrohydraulic actuator, an electromechanical actuator, and/or any other suitable actuator.

In some examples, articulation device 220 is configured to rotate each angled stabilizer portion 180 independently of the other angled stabilizer portion.

Figure 7:
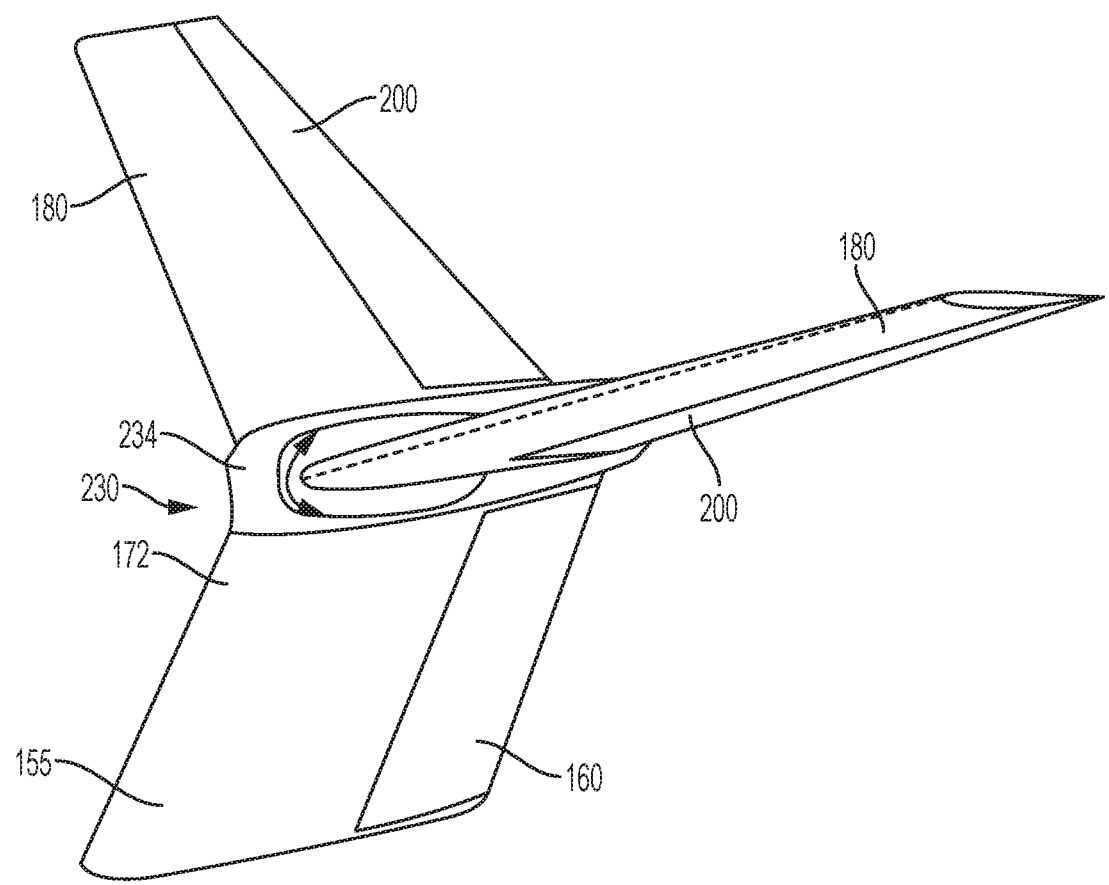
FIG. 7 is an isometric view of the V-tail empennage depicting an illustrative wiping surface device, in accordance with aspects of the present disclosure.

As shown in FIGS. 5-7, V-tail empennage 150 may include a fairing device 230 configured to reduce aerodynamic drag. Fairing device 230 is typically disposed at, and/or adjacent to, articulating mount 175. The size, shape, material composition, and/or any other suitable characteristics of fairing device 230 are designed to reduce drag associated with the combination of upper stabilizer assembly 170 and lower vertical member 155 connected by articulating mount 175. For example, fairing device 230 may be configured to reduce interference drag between upper stabilizer assembly 170 and lower vertical member 155.

In the example shown in FIGS. 5-6, fairing device comprises a bullet fairing 232 attached to lower portion 225 of upper stabilizer assembly 170. Bullet fairing 232 comprises an elongate surface or shell extending along lower portion 225 of upper stabilizer assembly 170. Surfaces of bullet fairing 232 may at least partially contain lower portion 225 of upper stabilizer assembly 170, distal portion 172 of lower vertical member 155, articulating mount 175, articulation device 220, and/or any other suitable adjacent empennage components, so that the fairing reduces drag associated with these components. In the example shown in FIGS. 5-6, bullet fairing 232 moves with upper stabilizer assembly 170 as the upper stabilizer assembly is rotated about rotation axis 215, and may therefore be referred to as an all-moving fairing.

Alternatively, or additionally, fairing device 230 may comprise a fixed or static fairing. An illustrative static fairing 234 is depicted in FIG. 7. Static fairing 234 is attached to distal portion 172 of lower vertical member 155. Lower portion 225 of upper stabilizer assembly 170 and articulation device 220 are typically contained within static fairing 234. Static fairing 234 comprises a wiping surface device configured to allow upper stabilizer assembly 170 to rotate relative to lower vertical member 155 while static fairing 234 remains fixed to the lower vertical member. In the example depicted in FIG. 7, angled stabilizer portions 180 protrude through openings in static fairing 234, and the openings are large enough to accommodate movement of the angled stabilizer portions during movement of upper stabilizer assembly 170. The wiping surface device includes wiping surfaces that are attached to angled stabilizer portions 180 and configured to cover the openings. The wiping surfaces slide relative to static fairing 234, allowing upper stabilizer assembly 170 to move relative to lower vertical member 155 within the static fairing. The use of wiping surfaces may enable low-drag integration of the trimmable upper stabilizer assembly relative to the supporting vertical fin. Wiping surfaces have been used, for example, in T-tail empennages of Boeing 717 and 727 aircraft.

Figure 8:
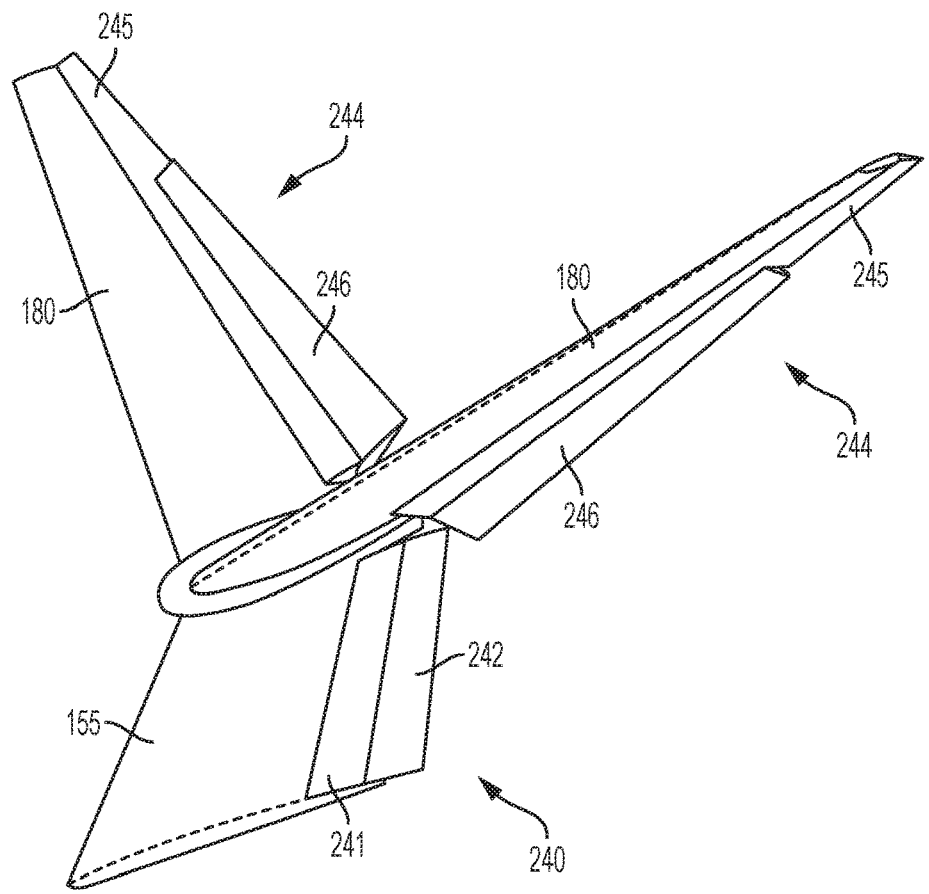
FIG. 8 is an isometric view of an illustrative V-tail empennage having double-hinged ruddervators and a double-hinged rudder.

As described above, the rudders and/or ruddervators of the V-tail empennage may be double-hinged. FIG. 8 is an isometric view of an example empennage having a double-hinged rudder 240 having a forward rudder surface 241 and an aft rudder surface 242. Forward rudder surface 241 is movably attached to lower vertical member 155. Aft rudder surface 242, which may also be referred to as a rudder tab, is movably attached to forward rudder surface 241. Accordingly, forward rudder surface 241 is configured to deflect relative to lower vertical member 155, and aft rudder surface 242 is configured to deflect relative to the forward rudder surface.

Aft rudder surface 242 may be configured to deflect in the same direction as forward rudder surface 241, in the opposite direction of the forward rudder surface, or selectively in either the same or the opposite direction. In examples wherein aft rudder surface 242 is configured to deflect in the same direction as forward rudder surface 241, the aft rudder surface may be referred to as an anti-servo tab or anti-balance tab. In examples wherein aft rudder surface 242 is configured to deflect in a direction opposite the deflection of forward rudder surface 241, the aft rudder surface may be referred to as a servo tab or balance tab.

FIG. 8 further depicts a pair of double-hinged ruddervators 244. Each double-hinged ruddervator 244 has a forward ruddervator surface 245 and an aft ruddervator surface 246. Forward ruddervator surface 245 is movably attached to angled stabilizer portion 180, and aft ruddervator surface 246 is movably attached to the forward ruddervator surface. Aft ruddervator surface 246 may comprise a balance tab, an anti-balance tab, and/or any other suitable tab, as described above with reference to aft rudder surface 242.

In the example depicted in FIG. 8, all control surfaces (e.g., forward rudder surface 241, aft rudder surface 242, forward ruddervator surfaces 245, and aft ruddervator surfaces 246) are deflected in a manner that provides a yaw moment to the left.

C. Illustrative Empennage with Inverted V-Shaped Tail

Figure 9:
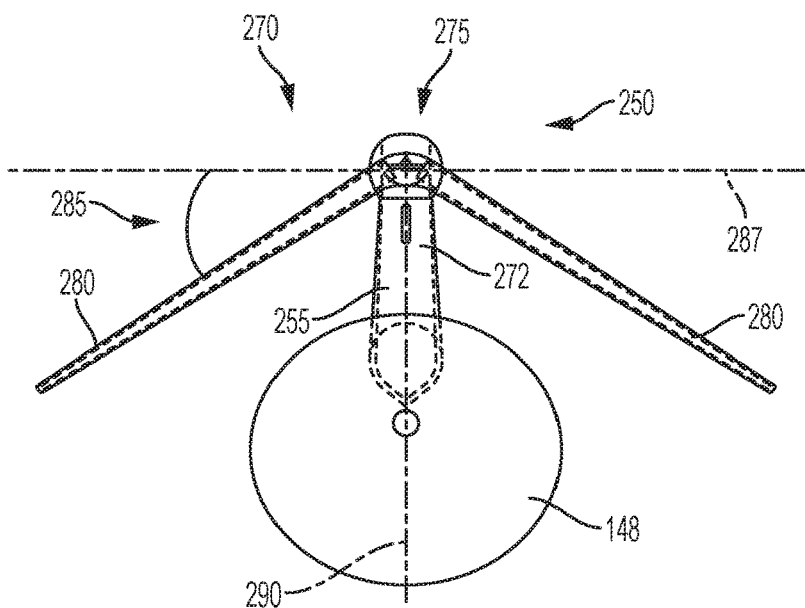
FIG. 9 is a front view of an illustrative inverted V-tail empennage in accordance with aspects of the present disclosure.

This section describes an illustrative inverted V-tail empennage 250, as shown in FIG. 9. Inverted V-tail empennage 250 is another example of an empennage having an articulated upper stabilizer assembly, as described above. In some respects, inverted V-tail empennage 250 is substantially similar to V-tail empennage 150. Accordingly, inverted V-tail empennage 250 includes a lower vertical member 255 attached to rear portion 148 of an aircraft fuselage. An upper stabilizer assembly 270 is adjustably mounted to a distal portion 272 of lower vertical member 255 via an articulating mount 275. Articulating mount 275 may include any suitable articulating devices and/or may be contained within any suitable fairing devices, as described above with reference to V-tail empennage 150.

Upper stabilizer assembly 270 includes a pair of angled stabilizer portions 280 forming a V-shaped tail member 281. Angled stabilizer portions 280 extend from articulating mount 275 in a downwardly facing angle. In contrast, angled stabilizer portions 180 of V-tail empennage 150 extend from articulating mount 175 in an upwardly facing angle. Accordingly, inverted V-tail empennage 250 is inverted relative to V-tail empennage 150. As shown in the front view of FIG. 9, angled stabilizer portions 280 each form a negative dihedral angle (e.g., an anhedral angle) 285 with a horizontal axis 287. Horizontal axis 287 extends through articulating mount 275 in a direction parallel to the pitch axis and perpendicular to a plane of symmetry 290 of fuselage 141.

Plane of symmetry 290 is depicted as an edge view in FIG. 9. Typically, angled stabilizer portions 280 are disposed at the same angle relative to horizontal axis 287, but in some examples, each angled stabilizer portion may form a different angle relative to the horizontal axis.

A ruddervator is disposed at a trailing edge of each angled stabilizer portion 280. Ruddervators of inverted V-tail empennage 250 may be adjusted to generate pitch moments, yaw moments, and/or pitch and yaw moments. As described above with reference to ruddervators 200 of V-tail empennage 150, symmetric operation of ruddervators of inverted V-tail empennage 250 typically produces a pitch moment, and asymmetric operation of the ruddervators of the inverted V-tail empennage typically produces a yaw moment. Inverted V-tail empennage 250 may include one or more double-hinged rudders and/or double-hinged ruddervators, as described above with reference to V-tail empennage 150.

As further described above with reference to V-tail empennage 150, operation of ruddervators of inverted V-tail empennage 250 to generate a yaw moment may also generate a roll moment. However, whereas ruddervators 200 of V-tail empennage 150 may generate a roll moment adverse to the generated yaw moment, ruddervators of inverted V-tail empennage 250 may generate a roll moment, sometimes called a proverse yaw-roll coupling, that reinforces the generated yaw moment.

D. Illustrative Empennage Control System

Figure 10:
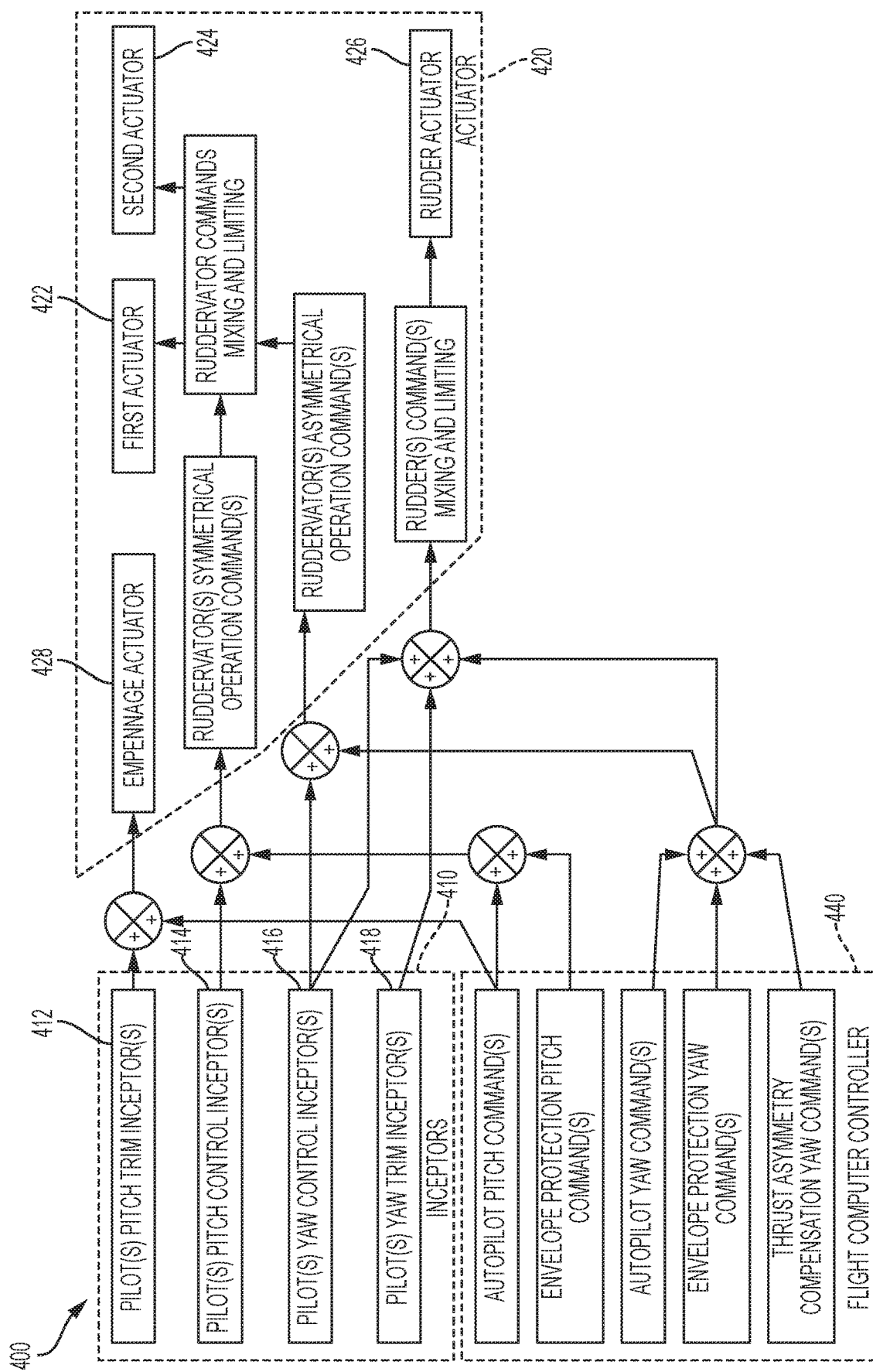
FIG. 10 is a schematic diagram depicting an illustrative empennage control system in accordance with aspects of the present disclosure.

This section describes an illustrative empennage control system 400, as shown in FIG. 10. Empennage control system 400, which may be part of aircraft control system 132, may be used to control an aircraft empennage in accordance with aspects of the present teachings.

Empennage control system 400 includes one or more inceptors 410 configured to send control signals that operate empennage control devices to generate a desired pitch and/or yaw moment. Inceptor 410 may comprise any input device usable (e.g., by an aircraft pilot) to operate empennage control devices. Illustrative inceptors 410 may include sticks, levers, throttles, yokes, control wheel and column modules, pedals, steering tiller devices, trim switches, buttons, electronic user interfaces, voice-command devices, and/or the like. Typically, inceptors 410 are categorized by the respective moment they are configured to contribute. For example, inceptors 410 may include a pitch trim inceptor 412, a pitch control inceptor 414, a yaw control inceptor 416, a yaw trim inceptor 418, and/or any other suitable inceptor.

Empennage control system 400 couples inceptors 410 to device actuators 420 configured to operate empennage control devices. For example, respective device actuators 420 may adjust positions of ruddervators and rudders, and rotate an upper empennage assembly relative to a lower vertical member. Device actuator 420 may comprise any suitable actuator, such as a jackscrew actuator, an electrohydraulic actuator, an electromechanical actuator, and/or the like. Typically, device actuators 420 include a first actuator 422 configured to operate a first ruddervator, a second actuator 424 configured to operate a second ruddervator, a rudder actuator 426 configured to operate a rudder, and an empennage actuator 428 configured to rotate an upper stabilizer assembly to a commanded orientation. Articulation device 220, described above, is an example of empennage actuator 428.

Empennage control system 400 may couple inceptors 410 to device actuators 420 by any suitable mechanism configured to cause the device actuators to operate respective devices according to input provided via the inceptors. For example, inceptors 410 may be coupled mechanically to device actuators 420 via tension cables, pushrods, pulleys, counterweights, and/or any other suitable mechanical parts. Additionally, or alternatively, inceptors 410 may be coupled to device actuators 420 via a hydraulic system, an electric and/or electronic system (e.g., fly-by-wire systems), an optical system (e.g., a fly-by-light system), and/or any other suitable system.

Empennage control system 400 may additionally couple a flight computer controller 440 to device actuators 420. Flight computer controller 440 is configured to automatically compute commands for device actuators 420. That is, flight computer controller 440 may generate commands without direct input from a pilot via inceptors 410. For example, flight computer controller 440 may be configured to execute an autopilot program that automatically sends to device actuators 420 one or more commands configured to cause the aircraft to take off, cruise, and/or land. The commands may include, e.g., yaw commands and/or pitch commands configured to effect actuator movement to generate respective yaw and/or pitch moments.

In some examples, flight computer controller 440 is further configured to generate commands configured to modify, counter-act, and/or compensate for commands input via inceptors 410 and/or generated by an autopilot program. For example, flight computer controller 440 may include an envelope protection program configured to generate pitch and/or yaw commands to prevent the aircraft from operating outside of safe performance limits, a thrust asymmetry compensation program configured to generate pitch and/or yaw commands to compensate for a disparity in thrust provided by aircraft propulsors, and/or any other suitable programs.

Flight computer controller 440 may generate pitch and/or yaw commands in accordance with one or more flight control modes and/or laws. For example, flight computer controller 440 may generate commands according to a first flight control law under normal operating conditions, and may switch to a second flight control law if conditions become abnormal (e.g., if one or more predetermined aircraft instruments or devices malfunction).

FIG. 10 schematically depicts an illustrative flow of commands and control signals from inceptors 410 and flight computer controller 440 to device actuators 420. For example, a pitch trim signal produced by pitch trim inceptor 412 is mixed with an autopilot pitch command from flight computer controller 440 to produce a signal to operate empennage actuator 428.

As another example, an autopilot pitch command is mixed with an envelope protection pitch command to obtain a computed pitch command, and the computed pitch command is mixed with a pitch control signal from pitch control inceptor 414 to produce a command signal to operate the ruddervators symmetrically. Additionally, or alternatively, an autopilot yaw command, envelope protection yaw command, and/or thrust asymmetry compensation yaw command are mixed together to produce a computed yaw command, and the computed yaw command is mixed with a yaw control signal from yaw control inceptor 416 to produce a command signal to operate the ruddervators asymmetrically. First and second actuator signals for operating first and second ruddervator actuators 422 and 424 are obtained based on the symmetric and asymmetric ruddervator operation command signals. In some cases, the first and second actuator signals are obtained by mixing the symmetric and asymmetric ruddervator operation command signals according to one or more ruddervator control laws. The control laws may, for example, ensure that the first and second actuator signals operate the ruddervators within safe aircraft performance limits.

As yet another example, the computed yaw command obtained based on the autopilot yaw command, the envelope protection yaw command, and the thrust asymmetry compensation yaw command may be mixed with a yaw control signal from yaw control inceptor 416 and a yaw trim signal from yaw trim inceptor 418 to produce a rudder command signal for operating rudder actuator 426.

E. Illustrative Method of Controlling an Aircraft

Figure 11:
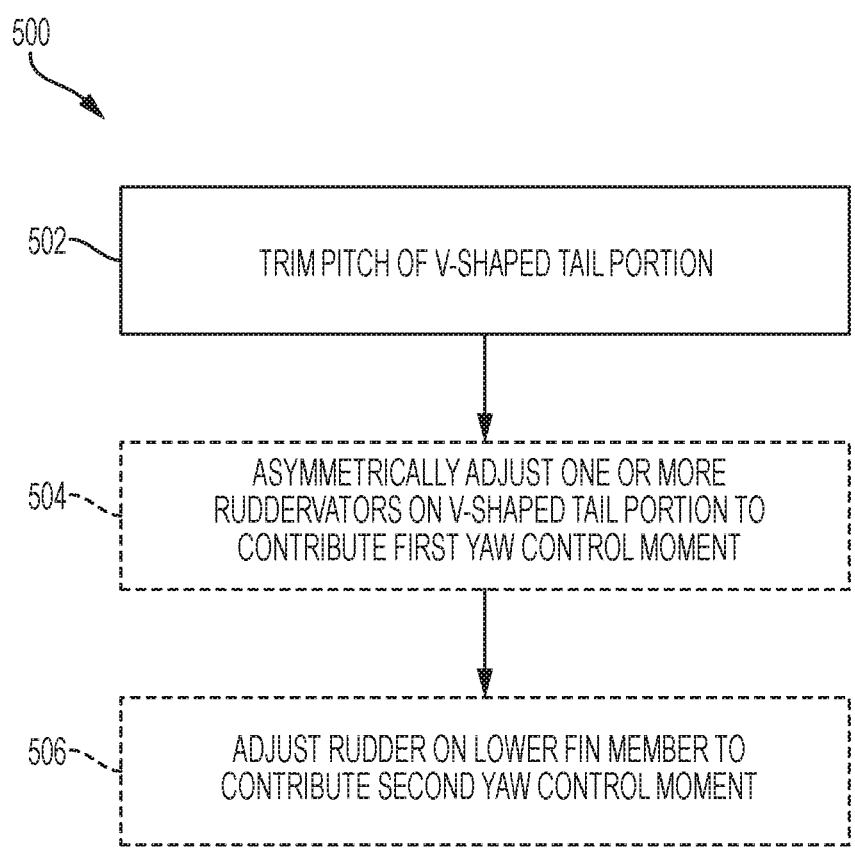
FIG. 11 is a flow diagram depicting steps of an illustrative method of controlling an aircraft, in accordance with aspects of the present disclosure.

This section describes steps of an illustrative method 500 for controlling an aircraft; see FIG. 11. Aspects of V-tail empennages and/or inverted V-tail empennages may be utilized in the method steps described below. Where appropriate, reference may be made to components and systems that may be used in carrying out each step. These references are for illustration, and are not intended to limit the possible ways of carrying out any particular step of the method.

FIG. 11 is a flowchart illustrating steps performed in an illustrative method, and may not recite the complete process or all steps of the method. Although various steps of method 500 are described below and depicted in FIG. 11, the steps need not necessarily all be performed, and in some cases may be performed simultaneously or in a different order than the order shown.

At step 502, method 500 includes trimming pitch of a V-shaped tail portion relative to a lower fin member connected to an end portion of an aircraft. The V-shaped tail portion may comprise an upper stabilizer assembly adjustably mounted to a lower fin member, such as upper stabilizer assemblies 170 and 270 described above. In some examples, trimming the V-shaped tail portion includes rotating the V-shaped tail portion relative to the lower fin member (e.g., around an axis perpendicular to a plane of symmetry of the aircraft).

At step 504, method 500 optionally includes asymmetrically adjusting one or more ruddervators on the V-shaped tail portion to generate a first yaw control moment on the aircraft. Typically, the V-shaped tail portion has a pair of ruddervators, and the two ruddervators are operated asymmetrically (e.g., one ruddervator is deflected upward, and one ruddervator is deflected downward) to generate the first yaw control moment. In some examples, however, generating the first yaw control moment can be accomplished by adjusting only one ruddervator. For example, one of the two ruddervators may already be positioned at an appropriate angle, so only the other ruddervator is adjusted to generate the yaw moment.

At step 506, method 500 optionally includes adjusting a trailing-edge rudder (e.g., rudder 160) on the lower fin member to generate a second yaw control moment on the aircraft. Additionally, or alternatively the rudder may be adjusted to generate a yaw trim moment.

F. Illustrative Method of Controlling Aircraft Ruddervators

Figure 12:
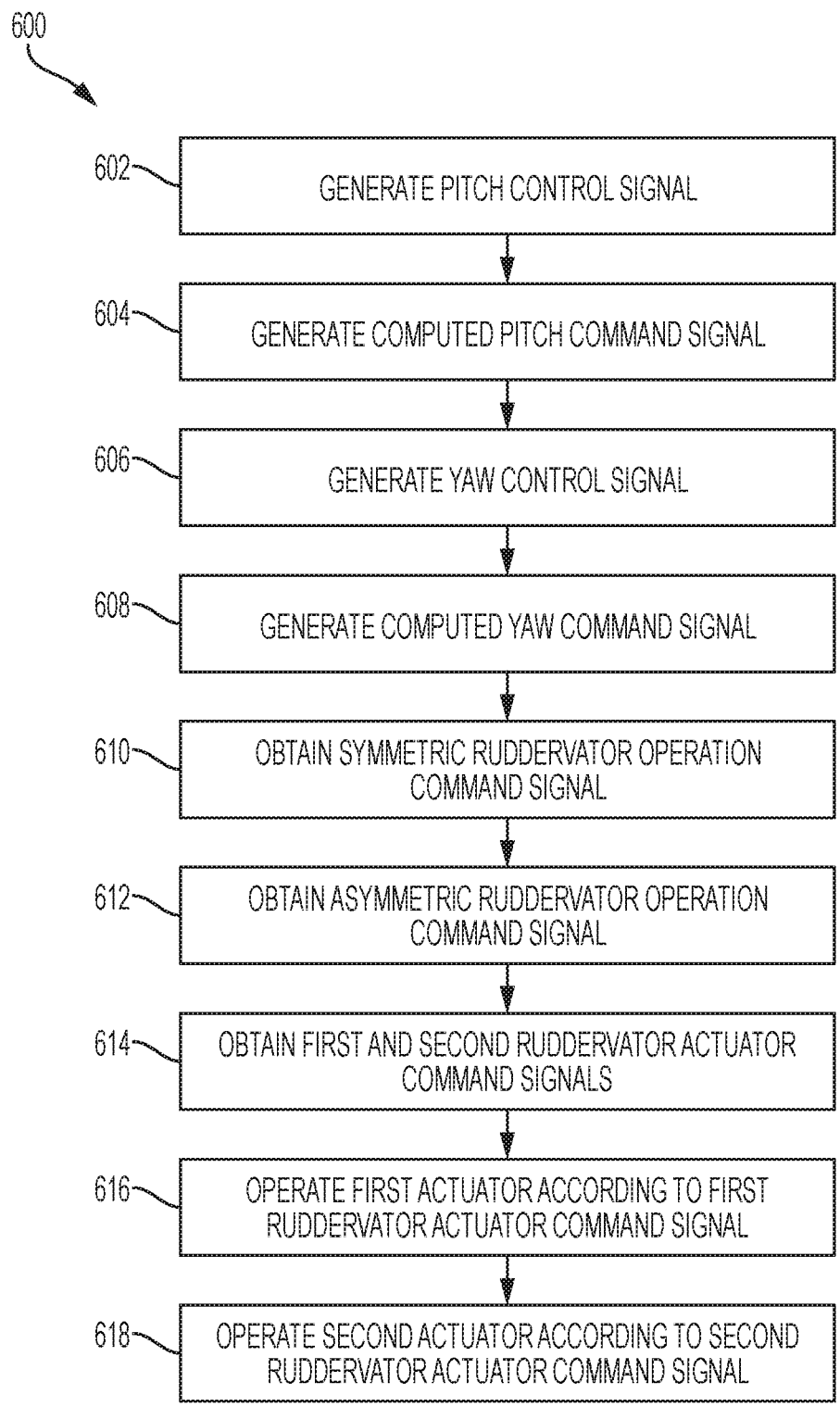
FIG. 12 is a flow diagram depicting steps of an illustrative method of controlling aircraft ruddervators, in accordance with aspects of the present disclosure.

This section describes steps of an illustrative method 600 of controlling aircraft ruddervators; see FIG. 12. Aspects of V-tail empennages, inverted V-tail empennages, and/or empennage control systems may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 600 are described below and depicted in FIG. 12, the steps need not necessarily all be performed, and in some cases may be performed simultaneously or in a different order than the order shown.

At step 602, method 600 includes generating a pitch control signal using a pitch control inceptor (e.g., pitch control inceptor 414).

At step 604, method 600 includes generating a computed pitch command signal using a flight computer controller (e.g., flight computer controller 440). Typically, the computed pitch command signal is generated automatically by the flight computer controller, whereas the pitch control signal generated at step 602 is generated by a pilot purposefully manipulating the pitch control inceptor. The computed pitch command signal may be obtained based on an autopilot pitch command signal, an envelope protection pitch command signal, and/or any other suitable flight-computer signals.

At step 606, method 600 includes generating a yaw control signal using a yaw control inceptor (e.g., yaw control inceptor 416).

At step 608, method 600 includes generating a computed yaw command signal using the flight computer controller. The computed yaw command signal may be obtained based on an autopilot yaw command signal, an envelope protection yaw command signal, a thrust asymmetry compensation yaw command signal, and/or any other suitable flight-computer signals.

At step 610, method 600 includes obtaining a symmetric ruddervator operation command signal based on the pitch control signal and the computed pitch command signal.

At step 612, method 600 includes obtaining an asymmetric ruddervator operation command signal based on the yaw control signal and the computed yaw command signal.

At step 614, method 600 includes obtaining a first ruddervator actuator command signal for a first actuator (e.g., first actuator 422) operatively coupled to a first ruddervator, and obtaining a second ruddervator actuator command signal for a second actuator (e.g., second actuator 424) operatively coupled to a second ruddervator. The first and second actuators may be configured to move the first and second ruddervators to respective first and second angular positions. In this case, the first and second ruddervator actuator command signals typically include information determining the first and second angular positions, respectively. Obtaining the first and second ruddervator actuator command signals may include combining the symmetric and asymmetric ruddervator operation command signals obtained in steps 610 and 612 according to at least one ruddervator control law. The control law may, for example, be configured to prevent the ruddervators from operating outside of a predetermined safe aircraft performance regime.

At step 616, method 600 includes operating the first actuator according to the first ruddervator actuator command signal. At step 618, method 600 includes operating the second actuator according to the second ruddervator actuator command signal.

G. Illustrative Combinations and Additional Examples

This section describes additional aspects and features of empennages having movable upper stabilizer assemblies, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A. An aircraft comprising a fuselage capable of carrying payload, the fuselage having a rear portion; an empennage connected to the rear portion of the fuselage, the empennage including a lower vertical member, and an upper stabilizer assembly connected to the lower vertical member by an articulating mount configured to allow movement of the entire upper stabilizer assembly relative to the lower vertical member to adjust pitch trim of the fuselage in a flight mode, the upper stabilizer assembly further including a V-shaped tail member having a pair of angled stabilizer portions, each angled stabilizer portion having a trailing-edge control surface; and a controller enabling independent asymmetric adjustment of the trailing-edge control surfaces generating a first yaw control moment acting on the aircraft.

A1. The aircraft of paragraph A, wherein the V-shaped tail member forms an upwardly facing angle.

A2. The aircraft of paragraph A, wherein the V-shaped tail member forms a downwardly facing angle.

A3. The aircraft of any one of paragraphs A through A2, wherein each angled stabilizer portion forms an angle with a horizontal axis of at least 20 degrees.

A4. The aircraft of any one of paragraphs A through A3, wherein the lower vertical member has a trailing-edge lower rudder for generating at least one of (i) a yaw trim moment acting on the aircraft, and (ii) a second yaw control moment acting on the aircraft.

A5. The aircraft of any one of paragraphs A through A4, wherein the articulating mount allows rotation of the upper stabilizer assembly around an axis substantially perpendicular to a plane of symmetry of the fuselage.

A6. The aircraft of any one of paragraphs A through A5, wherein the trailing-edge control surfaces comprise ruddervators.

A7. The aircraft of any one of paragraphs A through A6, wherein the lower vertical member comprises a lower fin member.

A8. The aircraft of any one of paragraphs A through A7, further comprising an articulation device including at least one of (i) a jackscrew actuator, (ii) a hydraulic actuator, (iii) an electrohydraulic actuator and an (iv) electromechanical actuator, for moving the entire upper stabilizer assembly relative to the lower vertical member to a commanded orientation.

A9. The aircraft of any one of paragraphs A through A8, further comprising at least one of (i) a fairing device, and (ii) a wiping surface device configured to reduce aerodynamic drag associated with the combination of the upper stabilizer assembly and the lower vertical member connected by the articulating mount.

B. An aircraft comprising a fuselage capable of carrying payload, the fuselage having a rear portion; an empennage connected to the rear portion of the fuselage, the empennage including a vertical fin member rigidly connected to the fuselage; and a V-shaped tail portion adjustably mounted to a distal portion of the vertical fin member.

B1. The aircraft of paragraph B, wherein the V-shaped tail portion is capable of articulating relative to the vertical fin member.

B2. The aircraft of any one of paragraphs B through B1, wherein the vertical fin member has a trailing rudder, and the V-shaped tail portion has a pair of ruddervators, the trailing rudder and the ruddervators being configured to cooperatively generate yaw control moments acting on the aircraft.

B3. The aircraft of paragraph B2, wherein the pair of ruddervators are configured to operate asymmetrically.

B4. The aircraft of paragraph B2, wherein each ruddervator forms an angle of at least 20 degrees relative to a horizontal axis.

B5. The aircraft of any one of paragraphs B1 through B4, wherein the V-shaped tail portion is configured to rotate relative to the vertical fin member around an axis perpendicular to a plane of symmetry of the fuselage.

C. An aircraft comprising a fuselage capable of carrying payload; a wing attached to the fuselage, the wing being capable of generating aerodynamic lift acting on the aircraft; a propulsor attached to the fuselage or the wing, the propulsor being capable of generating thrust acting on the aircraft; and an empennage attached to the aircraft, the empennage being capable of contributing to longitudinal and directional stability of the aircraft, wherein the empennage includes (i) a lower vertical tail member and (ii) an upper empennage member that is connected to the lower vertical tail member through an articulated mount, wherein the lower vertical tail member includes a trailing-edge controllable lower rudder capable of generating a yaw moment acting on the aircraft, wherein the upper empennage member includes a V-shaped tail member having a pair of angled stabilizer portions, each angled stabilizer portion having a trailing-edge ruddervator configured to generate both pitch and yaw moments acting on the aircraft.

C1. The aircraft of paragraph C, further comprising a controller programmed to operate the ruddervators asymmetrically generating a yaw control moment acting on the aircraft.

C2. The aircraft of paragraph C1, wherein the controller is programmed to operate the ruddervators in combination with the lower rudder to generate first and second yaw control moments acting on the aircraft.

C3. The aircraft of any one of paragraphs C through C2, wherein the articulated mount permits rotation of the entire upper empennage member around an axis perpendicular to a plane of symmetry of the fuselage.

D. A method of controlling an aircraft, comprising trimming pitch of a V-shaped tail portion relative to a lower fin member connected to an end portion of an aircraft.

D1. The method of paragraph D, further comprising asymmetrically adjusting one or more ruddervators on the V-shaped tail portion to generate a first yaw control moment on the aircraft.

D2. The method of paragraph D1, further comprising adjusting a trailing-edge rudder on the lower fin member to generate a second yaw control moment on the aircraft.

D3. The method of any one of paragraphs D through D2, wherein the trimming step includes rotating the V-shaped tail portion relative to the lower fin member, around an axis perpendicular to a plane of symmetry of the aircraft.

E. A method of controlling aircraft ruddervators, the method comprising generating a pitch control signal using a pitch control inceptor; generating a computed pitch command signal using a flight computer controller; generating a yaw control signal using a yaw control inceptor; generating a computed yaw command signal using the flight computer controller; obtaining, based on the pitch control signal and the computed pitch command signal, a symmetric ruddervator operation command signal; obtaining, based on the yaw control signal and the computed yaw command signal, an asymmetric ruddervator operation command signal; obtaining, based on the symmetric ruddervator operation command signal and the asymmetric ruddervator operation command signal, a first ruddervator actuator command signal and a second ruddervator actuator command signal; operating a first actuator according to the first ruddervator actuator command signal, the first actuator being operatively coupled to a first ruddervator; and operating a second actuator according to the second ruddervator actuator command signal, the second actuator being operatively coupled to a second ruddervator.

E1. The method of paragraph E, wherein generating the computed pitch command signal includes obtaining the computed pitch command signal based on an autopilot pitch command signal and an envelope protection pitch command signal.

E2. The method of any one of paragraphs E through E1, wherein generating the computed yaw command signal includes obtaining the computed yaw command signal based on an autopilot yaw command signal, an envelope protection yaw command signal, and a thrust asymmetry compensation yaw signal.

E3. The method of any one of paragraphs E through E2, wherein the first and second actuators are configured to move the first and second ruddervators to respective first and second angular positions, and the first and second ruddervator actuator command signals include information respectively determining the first and second angular positions.

E4. The method of any one of paragraphs E through E3, wherein obtaining the first and second ruddervator actuator command signals includes combining the symmetric and asymmetric ruddervator operation command signals according to at least one ruddervator control law.

Advantages, Features, and Benefits

The different examples of the empennage described herein provide several advantages over known empennage systems. For example, illustrative examples described herein allow an empennage having a low weight.

Additionally, and among other benefits, illustrative examples described herein allow an empennage having reduced wetted area and a low amount of aerodynamic drag.

Additionally, and among other benefits, illustrative examples described herein allow an empennage having control surfaces located above the aircraft wings (e.g., spaced from the wings by a vertical distance), so that the control surfaces avoid buffet from the wings.

Additionally, and among other benefits, illustrative examples described herein allow an empennage that occupies less space in the fuselage than conventional empennages. Conventional empennages typically have horizontal stabilizers mounted directly the fuselage, and therefore a portion of the fuselage interior is occupied by mounts and other structure associated with the horizontal stabilizers. An empennage in accordance with aspects of the present teachings includes ruddervators attached to angled stabilizer portions adjustably mounted on a vertical member. Accordingly, less fuselage space is required to accommodate structures associated with the empennage described herein.

Additionally, and among other benefits, illustrative examples described herein allow for trimming aircraft pitch by adjusting a position of a V-shaped tail portion relative to a vertical fin.

No known system or device includes the benefits described here and elsewhere in the specification. However, not all examples described herein provide the same advantages or the same degree of advantage.

CONCLUSION

The disclosure set forth above may encompass multiple distinct examples with independent utility. Specific examples as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An aircraft, comprising:
a fuselage capable of carrying payload, the fuselage having a rear portion;
an empennage connected to the rear portion of the fuselage, the empennage including a lower vertical member, and an upper stabilizer assembly connected to the lower vertical member by an articulating mount such that the entire upper stabilizer assembly is rotatable as a unit relative to the lower vertical member around an axis substantially perpendicular to a plane of symmetry of the fuselage to adjust pitch trim of the fuselage in a flight mode, the upper stabilizer assembly including a V-shaped tail member having a pair of angled stabilizer portions both angled upward or downward to collectively form an upwardly facing angle or a downwardly facing angle, respectively, each angled stabilizer portion having a trailing-edge control surface and forming an angle with a horizontal plane of at least 20 degrees; and
a controller enabling independent asymmetric adjustment of the trailing-edge control surfaces generating a first yaw control moment acting on the aircraft.

2. The aircraft of claim 1, wherein the V-shaped tail member forms the upwardly facing angle.

3. The aircraft of claim 1, wherein the V-shaped tail member forms the downwardly facing angle.

4. The aircraft of claim 1, wherein the lower vertical member has a trailing-edge lower rudder for generating at least one of (i) a yaw trim moment acting on the aircraft, and (ii) a second yaw control moment acting on the aircraft.

5. The aircraft of claim 1, wherein the trailing-edge control surfaces comprise ruddervators.

6. The aircraft of claim 5, wherein the lower vertical member has a lower rudder, and wherein the controller is programmed to operate the ruddervators in combination with the lower rudder to generate first and second yaw control moments acting on the aircraft.

7. The aircraft of claim 1, wherein the lower vertical member comprises a lower fin member.

8. The aircraft of claim 1, further comprising an articulation device including at least one of (i) a jackscrew actuator, (ii) a hydraulic actuator, (iii) an electrohydraulic actuator and an (iv) electromechanical actuator, for moving the entire upper stabilizer assembly relative to the lower vertical member to a commanded orientation.

9. The aircraft of claim 1, further comprising at least one of (i) a fairing device, and (ii) a wiping surface device configured to reduce aerodynamic drag associated with the combination of the upper stabilizer assembly and the lower vertical member connected by the articulating mount.

10. The aircraft of claim 1, further comprising a wing attached to the fuselage, the wing being capable of generating aerodynamic lift acting on the aircraft.

11. The aircraft of claim 10, further comprising a propulsor attached to the fuselage or the wing, the propulsor being capable of generating thrust acting on the aircraft.

12. An aircraft comprising:
a fuselage capable of carrying payload, the fuselage having a rear portion;
an empennage connected to the rear portion of the fuselage, the empennage including a vertical fin member rigidly connected to the fuselage; and
a V-shaped tail portion adjustably mounted to a distal portion of the vertical fin member, the V-shaped tail portion having a pair of angled stabilizer portions both angled upward or downward to collectively form an upwardly facing angle or a downwardly facing angle, respectively, each angled stabilizer portion having a trailing-edge control surface and forming an angle with a horizontal plane of at least 20 degrees, the entire V-shaped tail portion being rotatable as a unit relative to the vertical fin member around an axis substantially perpendicular to a plane of symmetry of the fuselage.

13. The aircraft of claim 12, wherein the vertical fin member has a trailing rudder, and the V-shaped tail portion has a pair of ruddervators, the trailing rudder and the ruddervators being configured to cooperatively generate yaw control moments acting on the aircraft.

14. The aircraft of claim 13, wherein the pair of ruddervators are configured to operate asymmetrically.

15. The aircraft of claim 13, wherein each ruddervator forms an angle of at least 20 degrees relative to a horizontal axis.

16. The aircraft of claim 12, further comprising an articulation device including at least one of (i) a jackscrew actuator, (ii) a hydraulic actuator, (iii) an electrohydraulic actuator and an (iv) electromechanical actuator, for moving the entire V-shaped tail portion relative to the vertical fin member to a commanded orientation.

17. The aircraft of claim 12, wherein the V-shaped tail portion is adjustably mounted to the distal portion of the vertical fin member using an articulating mount, further comprising at least one of (i) a fairing device, and (ii) a wiping surface device configured to reduce aerodynamic drag associated with a combination of the vertical fin member and the V-shaped tail portion adjustably mounted to the distal portion of the vertical fin member using the articulating mount.

18. A method of controlling an aircraft, comprising:
trimming pitch of a V-shaped tail portion relative to a lower fin member connected to an end portion of an aircraft, the V-shaped tail portion having a pair of angled stabilizer portions both angled upward or downward to collectively form an upwardly facing angle or a downwardly facing angle, respectively, each angled stabilizer portion having a trailing-edge control surface and forming an angle with a horizontal plane of at least 20 degrees; and
wherein trimming pitch includes rotating the entire V-shaped tail portion relative to the lower fin member around an axis substantially perpendicular to a plane of symmetry of the aircraft.

19. The method of claim 18, further comprising:
asymmetrically adjusting one or more ruddervators on the V-shaped tail portion to generate a first yaw control moment on the aircraft.

20. The method of claim 19, further comprising:
adjusting a trailing-edge rudder on the lower fin member to generate a second yaw control moment on the aircraft.

* * * * *